United States Patent [19]
Schmits et al.

[11] Patent Number: 6,096,999
[45] Date of Patent: Aug. 1, 2000

[54] REFLOW SOLDERING APPARATUS WITH A ROTATIVE CONFIGURATION

[75] Inventors: Jeroen Lambertus Schmits, Prinsenbeek; Rolf Arthur Den Dopper, Roosendaal, both of Netherlands

[73] Assignee: Soltec B.V., Netherlands

[21] Appl. No.: 09/029,420

[22] PCT Filed: Aug. 28, 1996

[86] PCT No.: PCT/NL96/00341

§ 371 Date: Feb. 26, 1998

§ 102(e) Date: Feb. 26, 1998

[87] PCT Pub. No.: WO97/07924

PCT Pub. Date: Mar. 6, 1997

[30] Foreign Application Priority Data

Aug. 29, 1995 [NL] Netherlands ............................ 1001089
Jan. 25, 1996 [NL] Netherlands ............................ 1002175

[51] Int. Cl.[7] ........................................................ F27B 7/00
[52] U.S. Cl. ........................ 219/389; 219/394; 228/180.1; 432/124
[58] Field of Search ...................................... 219/388, 394, 219/428; 228/180.1, 180.21, 180.22; 432/124, 128, 147, 162, 131

[56] References Cited

U.S. PATENT DOCUMENTS

| | | |
|---|---|---|
| 1,385,662 | 7/1921 | Bradley .................................. 432/141 |
| 3,272,933 | 9/1966 | Henderson . |
| 5,101,546 | 4/1992 | Otani et al. . |
| 5,296,680 | 3/1994 | Yamada .................................. 219/388 |
| 5,462,599 | 10/1995 | Kuster .................................... 118/503 |
| 5,573,688 | 11/1996 | Chanasyk et al. ...................... 219/388 |

FOREIGN PATENT DOCUMENTS

| | | |
|---|---|---|
| 0585204 | 3/1994 | European Pat. Off. . |
| 1461494 | 1/1977 | United Kingdom . |

*Primary Examiner*—Teresa Walberg
*Assistant Examiner*—Shawntina Fuqua
*Attorney, Agent, or Firm*—Banner & Witcoff, Ltd.

[57] ABSTRACT

The invention relates to an apparatus for subjecting objects to processes, wherein the apparatus comprises a plurality of chambers wherein are each adapted to contain at least one object; and processing devices for processing objects present in the chambers, wherein the chambers are adapted to successively perform different processes on the object present in the chamber. According to a first embodiment, the chambers are moveable in accordance with a closed circuit and the processing devices are adapted to perform a process on the object which is present in a chamber present in a defined position. According to a second embodiment the chambers are arranged fixedly and transporting means are arranged to carry the objects for processing and the processed objects in and out of the chambers.

43 Claims, 6 Drawing Sheets

REFLOW SOLDERING APPARATUS WITH A ROTATIVE CONFIGURATION

SUMMARY OF THE INVENTION

The invention relates to an apparatus for subjecting objects to processes, wherein the apparatus comprises:

a plurality of chambers which are each adapted to contain at least one object; and processing devices for processing objects present in the chambers.

BACKGROUND OF THE INVENTION

Such apparatus are generally known, for example in the form of reflow soldering apparatus which are constructed in a linear configuration. In these reflow soldering apparatus of the prior art a plurality of chambers is arranged which are each adapted to subject the objects present therein to a process, in the case of a reflow soldering apparatus to a temperature treatment in order to allow the soldering process to be performed. For this purpose a determined temperature is maintained in each of the relevant chambers and the object for processing, in this case the printed circuit board, passes through the various chambers so that, as seen in time, the object progresses through a temperature profile. The reflow solder process takes place as a result of progression through the temperature profile.

Such reflow soldering apparatus of the prior art are bulky. In view of the fact that such soldering apparatus are often utilized in places where space is expensive, there is a need for reflow soldering apparatus which take up a smaller volume.

This object is achieved in that the chambers are adapted to successively perform different processes on the object present in the chamber.

BRIEF DESCRIPTION OF THE INVENTION

According to a first preferred embodiment the chambers are moveable in accordance with a closed circuit, and the processing devices are adapted to perform a process on the object which is present in a chamber present in a defined position.

As a result of the configuration of a closed circuit according to which the chambers are moveable, it becomes possible to use a smaller volume, whereby the sought after economy of space is achieved.

An exceptional economy of space is achieved when the apparatus is adapted to cause the chambers to move according to a substantially circular path.

According to another preferred embodiment the apparatus is adapted to cause the chambers to move substantially through a rectangular path.

This configuration results, albeit at the expense of a complicated drive technique, in the apparatus taking up still less space than in the case of the embodiment in which there is a circular path. It is in any case possible with a rectangular path to arrange the chambers closer to each other so that less space is required.

According to yet another embodiment the chambers are arranged fixedly and transport means are arranged for transporting the objects for processing and processed objects in and out of the chambers. This offers the possibility of still greater space-saving because the chambers can be arranged connecting directly onto each other. It is pointed out here however that the infeed and outfeed means are rather complicated so that use is preferably made of a robot.

As stated, the apparatus is adapted according to a preferred embodiment to perform a temperature treatment on objects. The heat treatments for performing with the apparatus according to the invention are not limited to reflow soldering; a synthetic resin can likewise be cured with the apparatus.

It is also however also possible for the apparatus to be adapted to perform other processes on objects for processing, for instance processing the objects with a chemical substance. An example of such a process is cleaning objects by means of a plasma, in particular at least partially metal objects, for example printed circuit boards.

Arranged in each of the chambers according to yet another preferred embodiment are heating means in for instance the form of IR light sources which are adapted to heat by means of radiation the objects for heating which are present inside the chamber.

This embodiment is of particular importance when the process to which the objects for processing must be subjected requires a large positive temperature gradient which cannot be achieved with the supply means for supplying heated gas. The two types of heating can of course be combined.

Other preferred embodiments are specified in the remaining sub-claims.

BRIEF DESCRIPTION OF THE DRAWINGS

The invention will be elucidated hereinbelow with reference to the annexed drawings, in which.

DETAILED DESCRIPTION OF THE INVENTION

Figure 1:
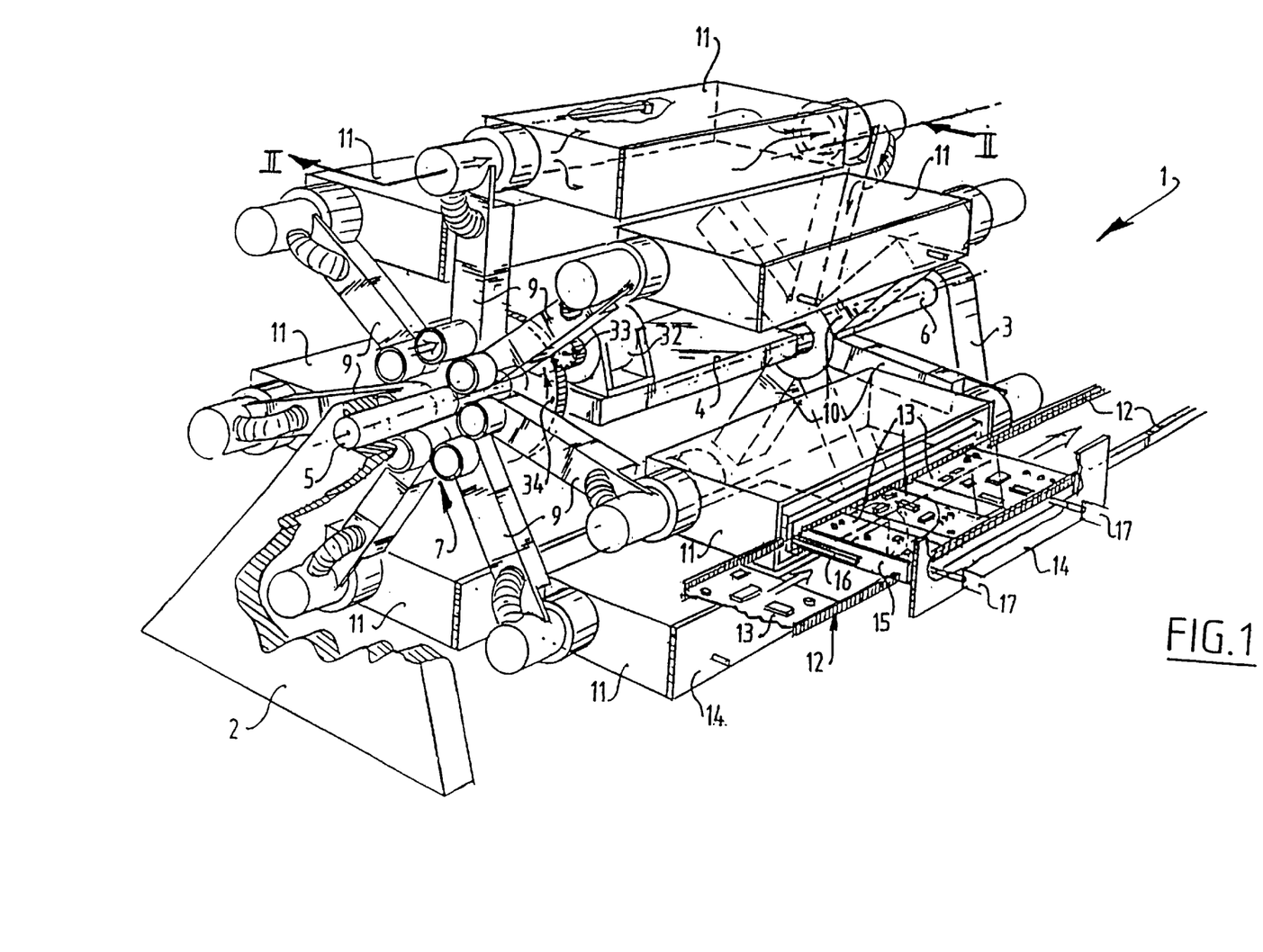
FIG. 1 shows a partly broken away schematic perspective view of an embodiment of an apparatus according to the invention.

In FIG. 1 is shown a reflow soldering apparatus 1 which forms part of a processing line, which also includes for instance so-called "pick and place" machines.

The soldering apparatus is essentially formed by a frame which is formed inter alia by a first trestle 2, a second trestle 3 and a bearing plate 4 which rests on the ground by means of a frame part not shown in the drawing.

A first rotation shaft 5 is mounted in the first trestle 2 and bearing plate 4, while a second rotation shaft 6 is mounted in trestle 3 and bearing plate 4. The rotation shafts 5, 6 are parallel but do not extend mutually in line. On rotation shaft 5 is arranged a first support member 7 which has a substantially star-shaped configuration. This support member is formed essentially by a plate 8 which is mounted on shaft 5 and to which hollow, radially extending arms 9 are fixed in the manner of a star 7. In corresponding manner a disc, not shown in FIG. 1, to which are fixed hollow arms 10 is arranged on shaft 6. The hollow arms 9,10 extend in each case in pairs parallel to each other.

A box 11 is arranged between each pair of parallel extending arms 9,10. The number of boxes is thus equal to the number of pairs of arms. Because of the fact that shafts 5,6 are displaced relatively of each other, the rotation points at which the boxes 11 are each rotatably connected to arms 9,10 are also each displaced relative to each other, so that as a result of this displacement the boxes 11 are always situated with their base plane horizontal.

It is of course possible instead to utilize other mechanisms to hold the boxes horizontal. It is possible for instance to arrange the shafts 5,6 on the same mathematical axis so that the rotation points of the boxes each mutually coincide, but wherein use can be made of for instance a weight on the underside of the box in order to hold the underside of the box in the horizontal plane. Use can further be made of crank mechanisms to hold the box horizontal. The present solution is however particularly effective and simple.

In order to cause the entire assembly of arms 9,10 and boxes 11 to rotate, use is made of an electric motor 32 which is arranged on bearing plate 4 and which by means of a pinion 33 fixed on its output shaft drives a toothed wheel 34 connected to shaft 5.

For arrangement of the objects for processing, in the present case printed circuit boards, in the relevant boxes 11 use is made of a conveyor belt 12. This latter supplies the printed circuit boards 13 for processing. Printed circuit boards 13 are transported into boxes 11 by means of the long side 14 of each of the boxes 11 which is moveable outward as shown in FIG. 1. The relevant side 14 is herein fixed to carriers arranged in the box which are outwardly moveable over guide rails 16 arranged in the box to the position shown in FIG. 1.

The printed circuit boards 13 for processing can be transported by means of the transport device 12 onto the carriers 15. For this purpose the conveyor belt is arranged such that it lies in line with carriers 15. Since the conveyor belt is generally unable to cause the printed circuit boards 13 for processing to move in their entirety onto carriers 15, use is made of a pushing element not shown in the drawing, the direction of which is parallel to the transport direction. When, as in the present case, both printed circuit boards 13 for processing have been arranged on carrier 15, the carriers including wall 14 are moved inward in the present case by means of an external linear drive mechanism 17, wherein the box is closed. It is pointed out here that because the temperature treatment takes place by means of causing heated respectively cooled gases to circulate, it is of the greatest importance that these gases do not leave the box. A gas-tight seal is arranged for this purpose between the side 14 of the box and the actual box 11 itself. This also prevents $O_2$ entering the box.

Starting from a situation in which the processed printed circuit boards are situated in the box, the carrier 15, including the side 14, is moved outward by means of the external drive mechanism 17 until carrier 15 is situated in line with conveyor belt 12. The conveyor belt 12 is then moved whereby the processed printed circuit boards are fed through by the transporting device to a subsequent processing station, and the printed circuit boards yet to be processed are transported onto carrier 15. Thereafter the cycle repeats itself. It is pointed out here that instead of the shown number of two printed circuit boards, it is also possible for only one printed circuit board to be received into a box or for a larger number of printed circuit boards to be used.

According to a preferred embodiment the carrier 15 is formed by two rails (not shown in the drawing) extending in the transport direction of the conveyor belt. So as to take account of printed circuit boards of differing width one of the rails is adjustable in the transverse direction. A separate drive device can be arranged in each of the boxes 11 for this purpose. However, it is also possible to arrange the drive device fixedly between two pushers 17. The width between the rails can then only be adjusted by means of coupling from the box 11 situated in the loading position.

It is further pointed out that rotational driving of the whole unit takes place intermittently; i.e. the apparatus stands still for a period of time, which period is of course co-determined by the length of the operations which must be performed for emptying respectively filling boxes 11 and of course also by the length of operations to be performed.

After such a standstill period a short movement takes place until all boxes have been shifted up one position, whereafter the cycle is repeated. It is pointed out here that use is made of the hollow arms 9 and 10 respectively for feed of the gases. Use is made for this purpose of a feed member which will be described hereinbelow, this feed member being adapted to supply gas of that temperature or quality suitable for performing a relevant process on the box 11 present in the relevant position.

Figure 2:
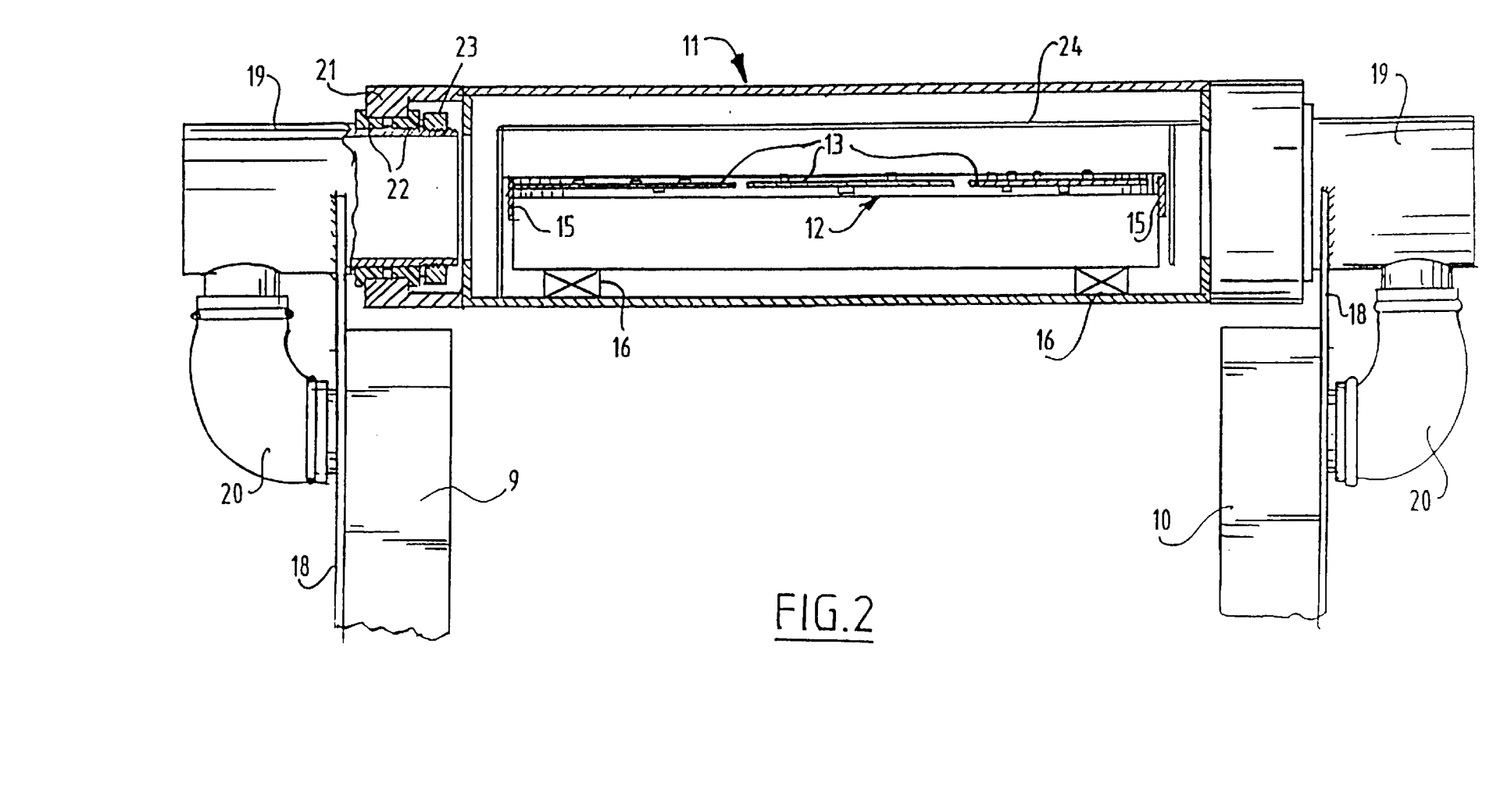
FIG. 2 shows a sectional view along the line II—II in FIG. 1.

How the boxes 11 are mounted on the ends of arms 9 will now be described with reference to FIG. 2. The arms 9 are provided with a flat side 18 which is continued beyond the end of the hollow part. This also applies to hollow arms 10. To this flat continuation 18 is welded a pipe piece 19 which extends in axial direction of the rotation shafts 5,6 and which is connected to the hollow part of the arms 9 and 10 respectively by means of an elbow 20 manufactured from flexible material. It is of course possible to make use of rigid elbows instead of elbows made of flexible material.

The pipe pieces 19 serve not only as guide for the gases supplied through the hollow arms 9 and the gases for discharging through the hollow arms 10, but also as rotation shaft for the rotatable suspension of boxes 11. To this end the boxes 11 are provided with a pipe end part 21 which is mounted on pipe piece 19 by means of a bearing 22. The bearing is further connected to a rotating seal 23 to seal off the gas flow relative to the environment. A corresponding construction is arranged on the side of the hollow arm 10.

A wall system 24 is further arranged for distributing the incoming gas flow in the boxes 11. This wall system, which is provided with holes (not shown in the drawing) arranged therein, ensures a good distribution of the supplied gases over the printed circuit boards for pre-heating. This produces the most uniform possible heating of the printed circuit boards and the components present thereon, which of course enhances the quality of the solder connections.

As stated, the entire frame described up to this point performs a rotating, intermittent movement.

Figure 3:
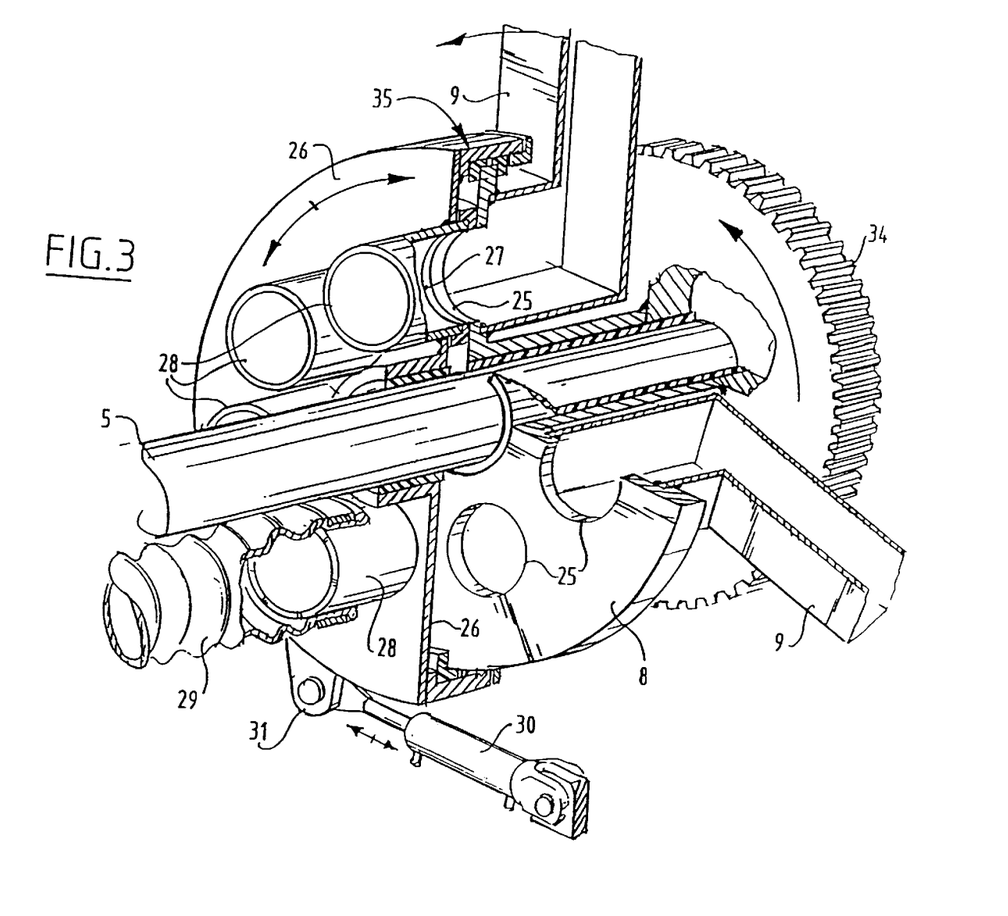
FIG. 3 shows a partly broken away perspective detail view of the apparatus depicted in FIG. 1.

As already mentioned, use is made of the hollow arms 9 connected onto disc 8 in order to supply the processing gases. Hollow arms 9 are in communication with the holes 25 arranged in disc 8. In order to supply the relevant processing gases to the arms 9 and the relevant hole 25 leading to the box situated in the correct position, use is made of a second disc 26 which is again mounted on shaft 5 and which, in contrast to disc 8, is freely rotatable relative to shaft 5. Also arranged in the second disc 26 are openings 27 which in the present case correspond in diameter and shape with the openings 25. On these openings stand pipe end parts 28 which are connected by means of flexible hoses 29 to generators for generating and supplying gas of the required temperature. These generators are not shown in the drawing. It is of course possible to make use of air as convection gas. Particularly for soldering processes it is attractive to make use of inert gas, for instance nitrogen. This is of course also the case for other applications. This is well possible due to the good sealing of the boxes 11, the rotating seals 22 and so on. The advantages of the smaller volume of the boxes and ducts are particularly emphasized in the case of an inert gas.

The normal position of the disc 26 is chosen such that the holes 28 arranged in the first disc 8 always correspond with holes 27 arranged in the second disc 26, so that no choking of the gas flow occurs. It is of course ensured here that the correct generator is connected by means of the relevant hose 29 and to the pipe end part 28, which gives a connection to the box 11 situated in the relevant position. So as to avoid any problem of choke effects during rotation of the whole assembly of arms 9,10 and boxes 11 arranged thereon, the disc 26 co-displaces with the rotation of the disc 8 for a large part of the relevant movement. For this purpose the disc 26 is driven in rotation by an air cylinder 30 connected thereto which is connected to disc 26 by means of a bracket 31.

In order of course to prevent leakage, use is further made of a sealing ring 35 with which a connection is formed between both discs 8,26.

It will be apparent that on the other side of the reflow soldering apparatus a corresponding component is arranged for the discharge of the gas coming from the relevant chamber to the generator corresponding therewith for reheating and optionally filtering the relevant gas.

The above described embodiment relates to an embodiment operating with convection; it is otherwise possible to cause the heating process to take place using radiation, in particular IR radiation. IR radiation elements must be built into the boxes for this purpose. It is moreover also possible to combine heating by convection with heating by radiation.

Figure 4:
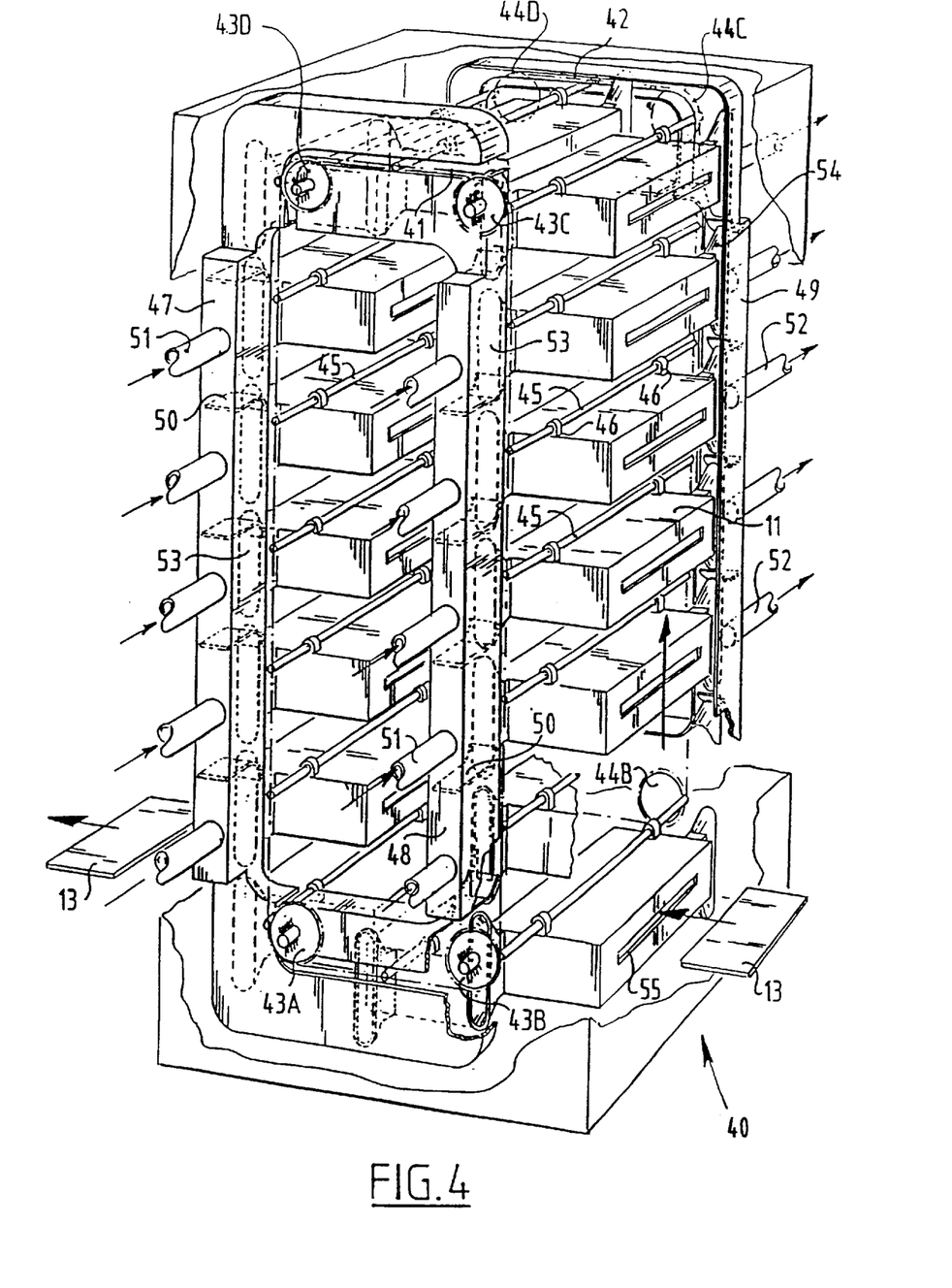
FIG. 4 shows a partly broken away perspective view of a second embodiment of the apparatus according to the invention.

In FIG. 4 an apparatus 40 is shown wherein the boxes 11 are driven in a substantially rectangular path. Use is made for this purpose of two schematically shown transporting chains 41 respectively 42 which are each trained around guide wheels 43a–d and 44a–d respectively. At least one of four guide wheels is herein driven at a time. The chains 41, 42 are always mutually connected by rods 45. A chamber 11 is fixed to each of the rods by means of suspension brackets 46. The suspension brackets 46 are constructed such that chambers 11 can rotate relative to rod 45; this is in any case necessary in order to hold the chambers 11 at all times in the horizontal position.

Other steps can however also be applied to hold the chambers in their horizontal position; a third chain for instance which is displaced in the plane perpendicular to shafts 45 relative to one of the two chains 41,42.

For further guiding of the chambers 11 use can be made of guide means (not shown in the drawing).

For respectively feeding gases to chambers 11 and for discharging gases from chambers 11 use is made of boxes 47,48,49 respectively and a box not shown in the drawing located on either side of the chains. These boxes extend parallel to the vertical parts of the path, wherein boxes 47–49 are each subdivided into separate spaces by means of partitions 50. A supply line 51 for supplying gas is connected to each of the boxes of chambers 47,48. This will generally be heated gas for heating objects resent in chambers 11, but can also be formed by cooled as for exercising a cooling function.

The boxes 49 and the box which is not shown are thus connected on the other side to discharge ducts 52 for discharging the gas which has performed the process.

Elongate openings 53 are arranged in each of the spaces for supplying the gases to the chambers. These openings connect to gas guide pieces (not shown in FIG. 4) fixed to each of the chambers 11.

When chamber 11 is situated at the height of an opening 53, the gas present in the relevant space of box 48 is guided through opening 53 through the gas guide piece into chamber 11. For discharging of the gases which have performed the process use is made of gas guiding elements 54 which are shown in the drawings and which are arranged on the other side of chambers 11 and which connect to openings arranged in box 49.

As a consequence of the fact that both holes 25 and openings 53 are elongate, a coupling is created over a rather long path between the relevant gas supply line 51, chamber 11 and gas discharge line 52. By varying the design of holes 53 and of gas guide pieces 54, the time durations and ratios can be adapted to the relevant requirements, wherein it can also be ensured that no short circuit occurs in the path of the gas.

It will be apparent that the configuration shown here can be changed in various ways; the box 49 and the box not shown here can thus be arranged on the same side of the apparatus as boxes 47 and 48. It is also possible, as shown, to allow the boxes to also extend on the underside, i.e. relating to the horizontal part of the path.

It is of course possible to make use of other gas supply and discharge means; the gas distribution device shown in FIG. 3 can thus be used for instance, wherein flexible hoses will have to provide a connection between holes 25 and the relevant chambers. The disc 26 will also have to driven synchronously with the drive device of the chains. A similar configuration can also be used for the gas discharge device.

For feed and discharge of the objects for processing, for instance printed circuit boards, use can be made of the system shown in the embodiment illustrated in FIG. 1.

It is also possible to make use of the embodiment shown in FIG. 4 wherein the printed circuit boards 13 are supplied on the one side of the apparatus 40 by means of a conveyor belt (not shown) and are carried into chamber 11 by means of a pushing member (likewise not shown) through a slot 55 arranged in the relevant wall of chamber 11. The relevant board can be discharged on the other side of the apparatus. A device (not shown in the drawing) will, however have to be constructed for this purpose which grips and pulls out the processed objects through a slot arranged in box 11 for that purpose. It is pointed out here that the infeed and outfeed slots must of course be closeable in order to hold the gas inside during performing of the processes. It is also possible to make use of a drawer system.

Figure 5:
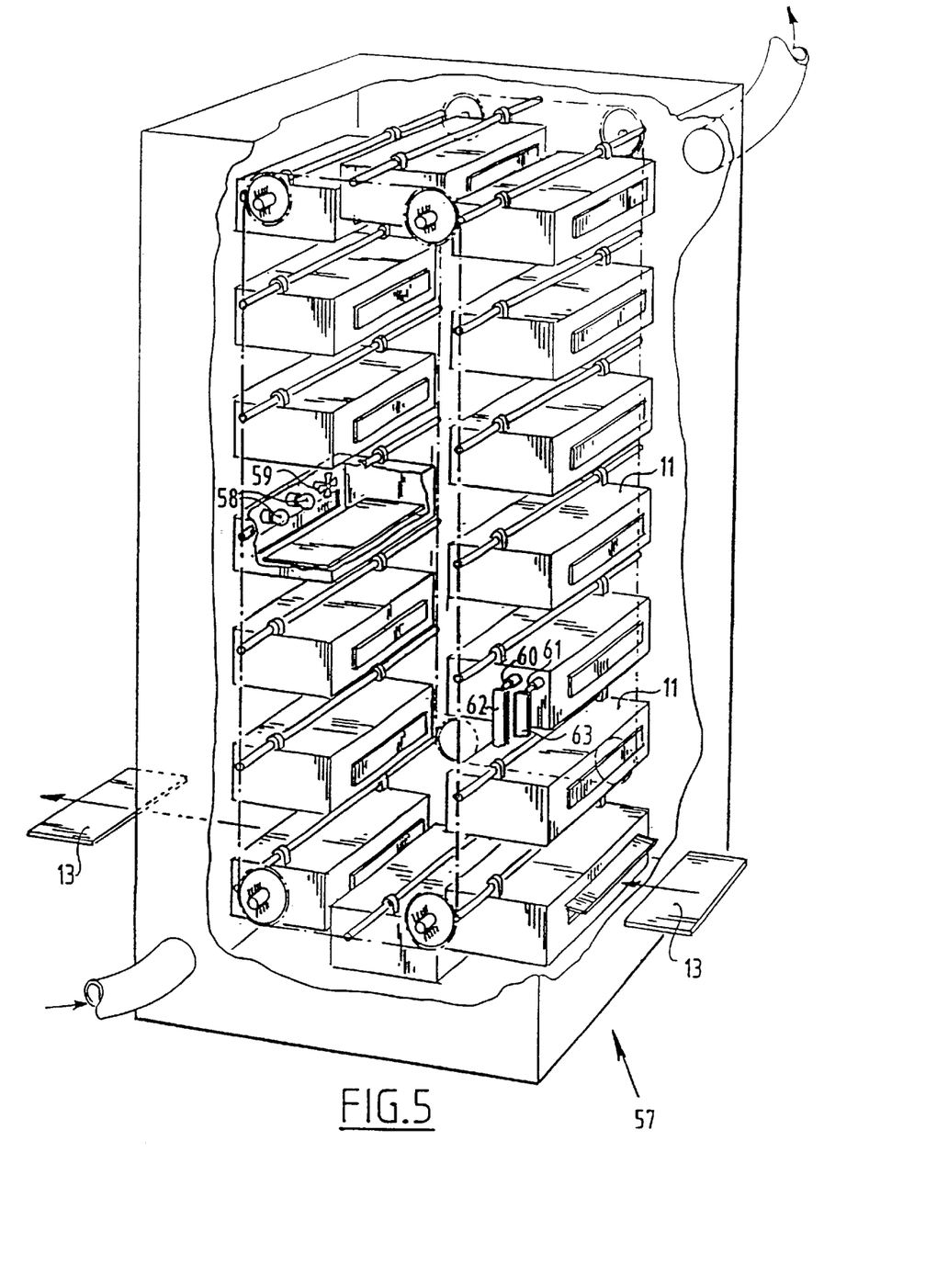
FIG. 5 shows a partly broken away perspective view of an alternative of the embodiment depicted in FIG. 4.

FIG. 5 shows an apparatus 57 which corresponds for the most part with the apparatus shown in FIG. 4. In this apparatus shown in FIG. 5 there are no gas supply and discharge lines but processing devices incorporated in the chambers 11 themselves. As can be seen in FIG. 5, in each of the boxes 11 is arranged a pair of infra red lamps 58 which have an output such that the objects present in boxes 11 can be heated to a sufficient degree therewith. It is of course possible to make use herein of lenses, diffusers, collimators or other optical assist means not shown in the drawing. A fan 59 is also arranged to obtain a good heat distribution. It is pointed out here that boxes 11 are each provided with sliding contacts 60,61 which slide along conductor paths 62 respectively 63 disposed parallel to the path of chain conveyor 41. This ensures the electrical energy supply to the electrical appliances arranged in boxes 11.

The choice of the position at which the heating device can be connected can of course also be made by selecting the position of both contact rails 62,63.

It is of course also possible to combine different steps of the apparatus shown in FIG. 5 with those of the apparatus shown in FIG. 4. It is thus possible for example to combine the IR heating of the apparatus shown in FIG. 5 with the heating by means of supplied gas; this is particularly useful when a high temperature gradient is desired.

In principle it is of course possible to provide the chambers 11 with an independently operating cooling installation; in view of the equipment required for this purpose such as compressor, evaporator and the like, this is not an attractive option. It is therefore useful to always have cooling take place by means of a gas supplied from outside.

Figure 6:
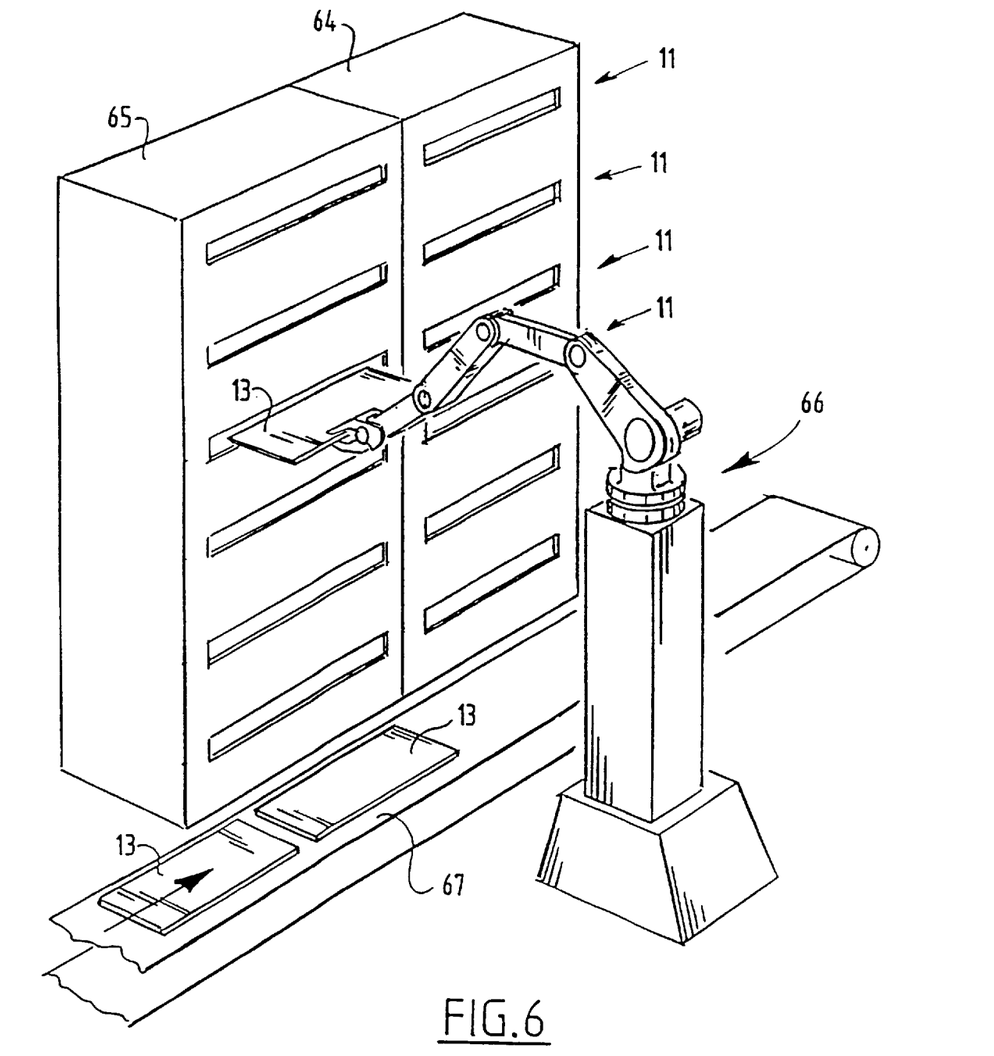
FIG. 6 shows a schematic perspective view of a third embodiment of an apparatus according to the invention.

Finally, FIG. 6 shows an embodiment of the apparatus wherein boxes 11 are stacked on top of each other. The boxes 11 are herein stacked in two stacks 64,65 so that they are immobile.

For supply and discharge of heating gas, cooling gas or gas acting in other manner, use can be made of fixed connections to sources for supply of gas or sinks for discharge of gas which has performed the process. It is of course necessary to arrange controllable valves in the relevant lines. It is of course also possible here to make use of heating units incorporated in the boxes 11. For feed and discharge of the objects for processing use is made of a robot 66. The robot 66 is herein programmed such that this takes the printed circuit boards for processing from conveyor belt 67, places them in a free chamber 11 and subsequently removes the printed circuit board which has undergone the process from another chamber 11 and re-places it on the conveyor belt.

Another field of application lies in the curing of synthetic resins by heating or by radiation. Such plastics are used for instance in the casting of components.

According to a preferred embodiment the apparatus is provided with a video camera which is directed at the interior of one of the boxes. This camera can be disposed fixedly and be connected to box 11 via a glass fibre, but can also be fixed in the box. This offers the possibility of visually observing the processes taking place in the box. By virtue of the fact that in the apparatus of the prior art the objects for processing move relative to the apparatus, this is not possible therein.

It is further possible to arrange a plurality of thermocouples in the box 11 which are connected by needles to the positions on the printed circuit board with which it is wished to measure the temperature.

Although the embodiment above relates to reflow soldering, it will be apparent that the apparatus can also be used as pre-heating unit for wave soldering.

Because the chambers are exposed to large temperature-time gradients, it is important that the chambers be manufactured from a material with a small heat capacity; this results in any case in a lower energy consumption and a shorter time constant.

It will be apparent that various modifications can be made to the construction shown without deviating from the present invention.

What is claimed is:

1. Apparatus for subjecting objects to processes, wherein the apparatus comprises:

a plurality of chambers which are each adapted to contain at least one object; and processing devices for processing objects present in the chambers, wherein the chambers are adapted to successively perform different processes within the same chamber without removing the object therefrom, and wherein the chambers are moveable in accordance with a closed circuit and that the processing devices are adapted to perform a process on the object which is present in a chamber that is located in a defined position.

2. Apparatus as claimed in claim 1, further comprising infeed and outfeed means for carrying the objects for processing into the chambers and for carrying the processed objects out of the chambers, wherein the infeed and outfeed means are adapted to feed the objects in and out at only a single position of the chambers.

3. Apparatus as claimed in claim 1, wherein the infeed and outfeed means include transporting members which are intermittently drivable.

4. Apparatus as claimed in claim 1, wherein the apparatus is adapted to cause the chambers to move in accordance with a substantially circular path.

5. Apparatus as claimed in claim 4, wherein the apparatus further comprises at least two suspension members each rotatable round a respective shaft, wherein each of the chambers is fixed to both suspension members and wherein the shafts are mutually parallel.

6. Apparatus as claimed in claim 5, wherein the shafts extend in a horizontal plane.

7. Apparatus as claimed in claim 6, wherein the shafts are mutually displaced.

8. Apparatus as claimed in claim 1, wherein the apparatus is adapted to cause the chambers to move in accordance with a substantially rectangular path.

9. Apparatus as claimed in claim 8, wherein the chambers are suspended on at least two flexible transporting members which are guided over guide members.

10. Apparatus as claimed in claim 9, wherein a third transporting member is arranged for holding the chambers in a horizontal position.

11. Apparatus as claimed in claim 1, wherein the chambers are arranged in fixed positions, and wherein transporting means are arranged to carry the objects in and out of the chambers.

12. Apparatus as claimed in claim 11, wherein the chambers are aligned with each other in at least one vertical stack.

13. Apparatus as claimed in claim 11, wherein the transporting means for carrying the objects in and out of the chambers includes a robot.

14. Apparatus as claimed in claim 1, wherein the apparatus is adapted to perform a temperature treatment on the objects.

15. Apparatus as claimed in claim 14, wherein the apparatus is a reflow soldering apparatus.

16. Apparatus as claimed in claim 14, wherein the apparatus is adapted to at least partially perform the temperature treatment by supplying gases to the chambers and discharging gases from the chambers.

17. Apparatus as claimed in claim 16, further comprising a plurality of gas discharge means and a plurality of gas supply means, wherein each of said gas discharge means are coupled to a respective one of the gas supply means to form a closed circuit.

18. Apparatus as claimed in claim 16, wherein the apparatus further comprises coupling means for coupling individual gas supply means and gas discharge means to one of the chambers subject to the position of said one of said chambers.

19. Apparatus as claimed in claim 5, further comprising coupling means adapted to couple individual gas supply means and gas discharge means, subject to the rotational position of the suspension members, to ducts which are incorporated in at least one of the suspension members and which lead to the separate chambers.

20. Apparatus as claimed in claim 19, wherein the coupling means comprise a first disc provided with holes, wherein the holes are each coupled to one of said ducts leading to the chambers, and a second disc which is disposed parallel to and abutting the first disc, which second disc is provided with holes which are coupled to either the gas supply means or gas discharge means.

21. Apparatus as claimed in claim 20, wherein the second disc is coupled to a drive element in order to cause the second disc to perform an intermittent movement so as to cause the holes in the first disc to correspond with the holes in the second disc.

22. Apparatus as claimed in claim 21, wherein the drive element is formed by a first drive disc.

23. Apparatus as claimed in claim 8, wherein the apparatus further comprises spaces extending along the path of the chambers, a plurality of said spaces being connectable to an adjacent one of the chambers by openings arranged in the chambers and in the spaces such that a connection is formed between the adjacent chamber and the plurality of spaces when the openings in said adjacent chamber and said plurality of spaces are in register, and wherein each space is connected to either a gas supply means or a gas discharge means.

24. Apparatus as claimed in claim 11, wherein the chambers are at least partially provided with gas supply means and gas discharge means.

25. Apparatus as claimed in claim 1, wherein the chambers are adapted to perform re-circulation of the gas inside the chamber.

26. Apparatus as claimed in claim 25, further comprising heating means in each of the chambers which are adapted to heat the gas present inside the chamber.

27. Apparatus as claimed in claim 25, wherein the heating means in each of the chambers are adapted to heat the at least one object present inside the chamber by radiation.

28. Apparatus as claimed in claim 1, wherein the chambers are manufactured from material with a low heat capacity.

29. Apparatus as claimed in claim 14, wherein the apparatus is suitable for curing curable material by heating or radiation.

30. Apparatus as claimed in claim 1, wherein the chambers are each provided on one side with a wall which is moveable outward in a direction perpendicular to a plane occupied by the wall.

31. Apparatus as claimed in claim 30, wherein the moveable wall is fixedly connected on an inner side thereof to a carrier for the objects for processing, and wherein the carrier is coupled to guide means arranged in a respective one of the chambers for guiding the carrier and the wall.

32. Apparatus as claimed in claim 31, further comprising a conveyor belt, and wherein the carrier comprises at least two support elements which extend in a transporting direction of the conveyor belt, and at least one of said support elements is adjustable in a direction transverse of its length direction for supporting objects having different widths.

33. Apparatus as claimed in claim 32, wherein the carrier is situated in a path of a transport member when in an extended position for feeding objects into the chambers for processing and discharging the objects which have been processed.

34. Apparatus as claimed in claim 33, wherein the at least one adjustable support element is provided with coupling means for adjusting a position of the at least one support element when the carrier is situated in the path of the transport member.

35. Apparatus as claimed in claim 1, wherein the apparatus is provided with an observation system for observing the processes taking place in the chambers.

36. Apparatus as claimed in claim 35, wherein the observation device comprises at least one video camera.

37. Apparatus as claimed in claim 35, wherein the observation device comprises at least one temperature measuring device.

38. Apparatus as claimed in claim 9, wherein said at least two flexible transporting members are selected from the group consisting of belts and chains.

39. Apparatus as claimed in claim 38, wherein said guide members are drivable, and wherein said guide members include wheels.

40. Apparatus as claimed in claim 27, wherein said heating means include IR light sources.

41. Apparatus as claimed in claim 28, wherein said low heat capacity material includes plastic.

42. Apparatus as claimed in claim 29, wherein said curable material includes a synthetic resin.

43. Apparatus as claimed in claim 34, further comprising a motor for driving the coupling means.

* * * * *